US012357987B2

(12) United States Patent
Han

(10) Patent No.: US 12,357,987 B2
(45) Date of Patent: Jul. 15, 2025

(54) DEVICE FOR ANALYZING SINGLE CELL USING MICROPORES

(71) Applicant: Korea University Research and Business Foundation, Seoul (KR)

(72) Inventor: Chang Soo Han, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 756 days.

(21) Appl. No.: 17/698,055

(22) Filed: Mar. 18, 2022

(65) Prior Publication Data

US 2022/0314219 A1 Oct. 6, 2022

(30) Foreign Application Priority Data

Mar. 31, 2021 (KR) .................. 10-2021-0041550

(51) Int. Cl.
*B01L 3/00* (2006.01)
(52) U.S. Cl.
CPC ..... *B01L 3/502715* (2013.01); *B01L 3/50273* (2013.01); *B01L 3/502753* (2013.01); *B01L 2200/16* (2013.01); *B01L 2300/0645* (2013.01); *B01L 2300/0681* (2013.01); *B01L 2400/0487* (2013.01)
(58) Field of Classification Search
CPC .......... B01L 3/502715; B01L 3/50273; B01L 3/502753; B01L 2200/16; B01L 2300/0645; B01L 2300/0681; B01L 2400/0487
See application file for complete search history.

(56) References Cited

U.S. PATENT DOCUMENTS

| 2007/0284254 A1 | 12/2007 | Cho et al. |
| 2012/0146619 A1 | 6/2012 | Niiyama |
| 2014/0374255 A1 | 12/2014 | Hongo et al. |
| 2022/0011231 A1 | 1/2022 | Han et al. |

FOREIGN PATENT DOCUMENTS

| JP | 2010-513876 A | 4/2010 |
| JP | 5161218 B2 | 3/2013 |
| JP | 6800862 B2 | 12/2020 |
| KR | 10-0813254 B1 | 3/2008 |
| KR | 10-2014-0046521 A | 4/2014 |
| KR | 10-2017-0137361 A | 12/2017 |
| KR | 10-1909446 B1 | 10/2018 |

(Continued)

OTHER PUBLICATIONS

Ryu, Jihun, et al. "Micropore device for identification of 4-bit hydrogel barcode." Sensors and Actuators B: Chemical 307 (2020): 127622, (6 pages in English).

(Continued)

*Primary Examiner* — Brian J. Sines
(74) *Attorney, Agent, or Firm* — NSIP Law

(57) ABSTRACT

Disclosed is a device for analyzing a single cell using a micropore including an inlet chamber; an outlet chamber provided on an opposite side of the inlet chamber; a pore membrane disposed between the inlet chamber and the outlet chamber; a pressure generating means provided in the inlet chamber or the outlet chamber; and a pair of electrodes respectively disposed in front and rear of the pore membrane, wherein a diameter D of the micropore is larger than a diameter of the target cell, a thickness t of the pore membrane is 0.5 μm to 1 mm, and a slenderness ratio (t/D) is 0.001 to 5.

11 Claims, 4 Drawing Sheets

(56) References Cited

FOREIGN PATENT DOCUMENTS

| | | |
|---|---|---|
| KR | 10-1987556 B1 | 6/2019 |
| KR | 10-2020-0055493 A | 5/2020 |
| KR | 10-2176130 B1 | 11/2020 |
| WO | WO 2009/022152 A1 | 2/2009 |
| WO | WO 2011/162582 A2 | 12/2011 |

OTHER PUBLICATIONS

Extended European search report issued on Aug. 1, 2022, in counterpart European Patent Application No. 22164244.0 (8 pages in English).

Korean Office Action Issued on Jan. 12, 2023, in counterpart Korean Patent Application No. 10-2021-0041550 (7 Pages in Korean).

[FIG. 1]
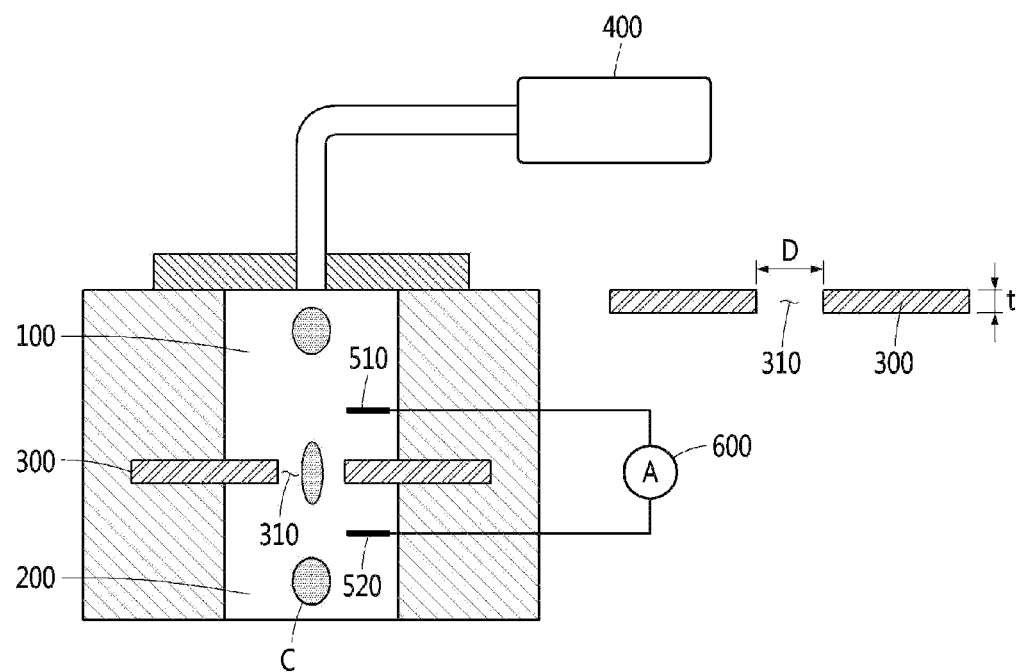

【FIG. 2A】
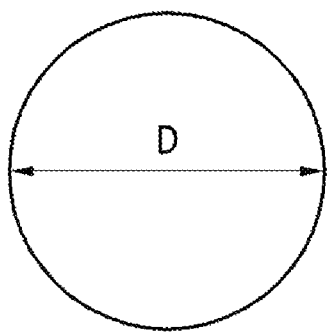
【FIG. 2B】
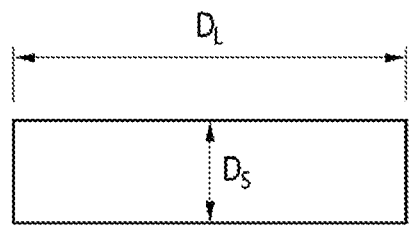
【FIG. 2C】
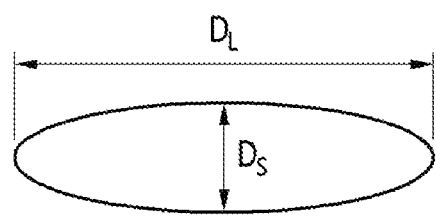
【FIG. 2D】
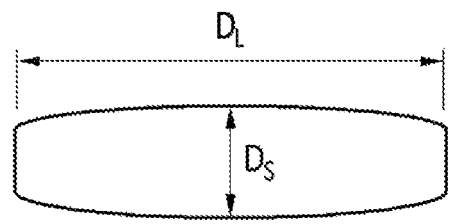

[FIG. 3A]
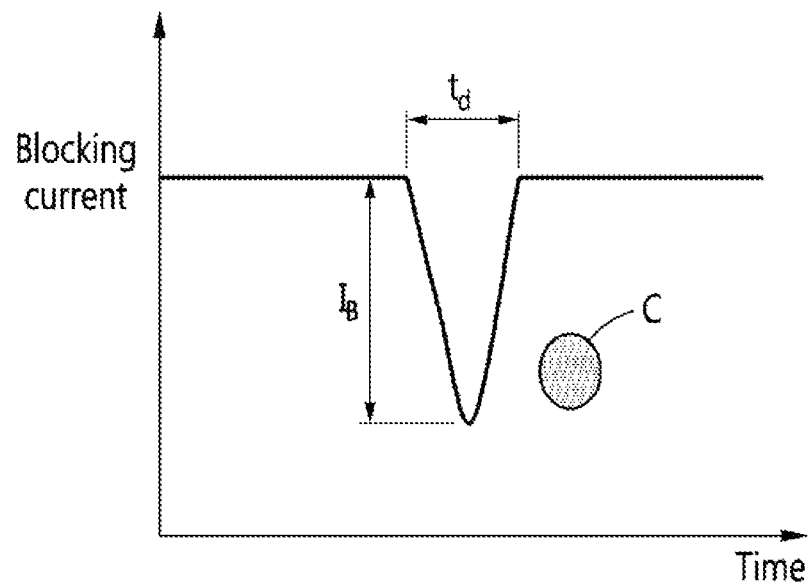
[FIG. 3B]
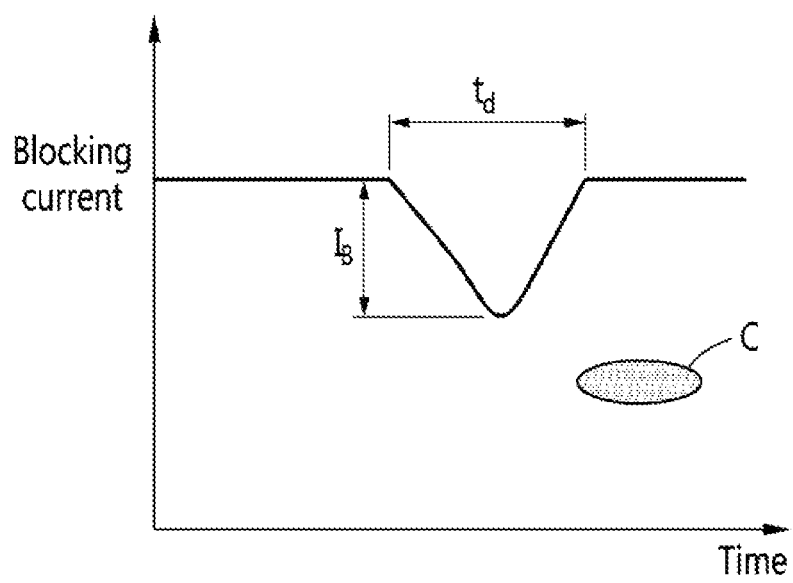

【FIG. 4】
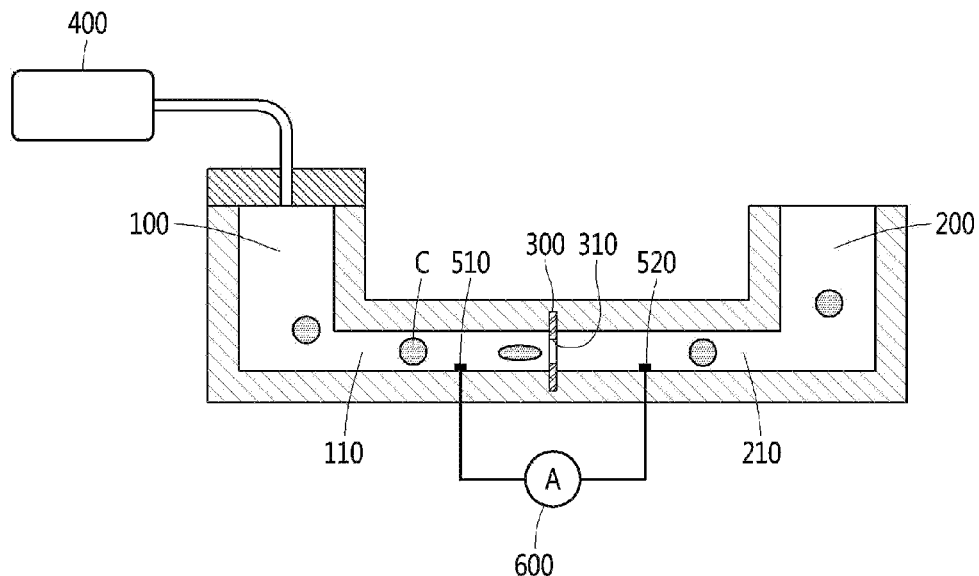
【FIG. 5】
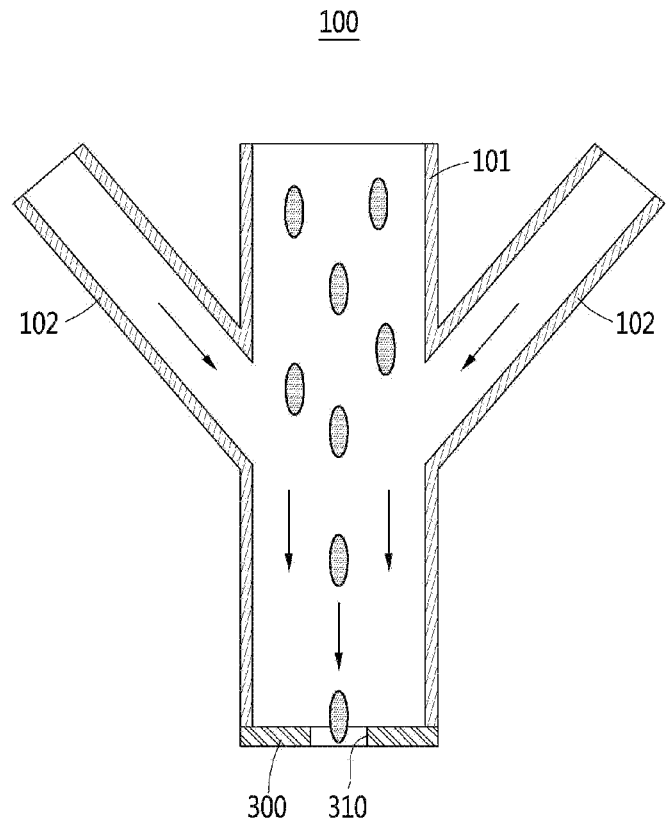

DEVICE FOR ANALYZING SINGLE CELL USING MICROPORES

CROSS-REFERENCE TO RELATED APPLICATION

This application claims priority to Korean Patent Application No. 10-2021-0041550, filed on Mar. 31, 2021 in the Korean Intellectual Property Office, the disclosure of which is incorporated herein by reference.

BACKGROUND OF THE DISCLOSURE

Field of the Disclosure

The present disclosure relates to a device for analyzing a single cell, and more particularly, to a device for analyzing the number, size, shape, deformability, etc. of single cells in multiple cells with a diameter greater than or equal to micrometers, such as blood cells, white blood cells and circulating tumor cells, using a micropore.

Description of the Related Art

In general, micropore devices can analyze materials passing through a micropore while controlling the passage of ions in an ionic fluid environment.

This is similar to the principle of the existing Coulter counter, but enables more precise analysis of individual cells using a low aspect ratio wherein the thickness (t) of a pore membrane in which a micropore is formed is very thin compared to the diameter (D) of the micropore.

For example, in the case of red blood cells, a rough result regarding the number or size of cells can be obtained, but the shape of the cells cannot be clearly known by using the Coulter counter method. This is because the thickness (t) of a pore membrane is very large compared to cells passing through the membrane.

Accordingly, when red blood cells undergo deformation while passing through a micropore, the degree of deformation cannot be confirmed.

Meanwhile, red blood cells in the human body have the shape of a disk of about 2 µm to about 3 µm thick and about 6 µm to about 8 µm in diameter, and serve to supply oxygen while circling the human body.

In particular, when red blood cells show a characteristic of being deformed to fit a channel when pass through narrow blood vessels, they, which is called deformability.

In the case of diseases such as malaria, sickle cell and hereditary red blood cell abnormality, cells have a characteristic of being hardened. In particular, it was reported that patients with cardiovascular problems tend to have blood circulation problems as the deformability of red blood cells decreases.

Conventionally, various methods such as a microscope, a scanning probe microscope (AFM), cytometry, a spectrophotometer, and a filtration filter have been utilized to measure the deformability of red blood cells, but a technology of precisely analyzing individual cells one by one at high speed has not been developed until now.

In addition, a method of measuring a plurality of red blood cells by a light scattering method or a method of checking cells one by one by a coloring method and an optical measurement method has been mainly used, which has problems in that early diagnosis is difficult, expensive equipment is required, or a lot of time is required.

Accordingly, the technology of individually analyzing blood cells is a very important medical technology because it can be used to diagnose or predict related diseases at an early stage.

RELATED ART DOCUMENT

Patent Document (Patent Document 1) Korean Patent No. 10-2176130 (published on Nov. 10, 2020)

SUMMARY OF THE DISCLOSURE

Therefore, the present disclosure has been made in view of the above problems, and it is an object of the present disclosure to provide a device for analyzing a single cell using a micropore, the device capable of measuring simultaneously and rapidly the size, number, shape and deformability of individual cells measured when the cells contained in a solution, which flows in one direction by pressure, pass through a pore with a micro-sized diameter and low aspect ratio inside a channel by generating a pressure difference between an inlet chamber and an outlet chamber.

In accordance with an aspect of the present disclosure, the above and other objects can be accomplished by the provision of a device for analyzing a single cell using a micropore, including: an inlet chamber in which a solution including a target cell is contained; an outlet chamber provided on an opposite side of the inlet chamber; a pore membrane disposed between the inlet chamber and the outlet chamber and configured to include a micropore thereon; a pressure generating means provided in the inlet chamber or the outlet chamber and configured to generate a pressure difference between the inlet chamber and the outlet chamber such that a solution in the inlet chamber flows toward the outlet chamber to pass through the micropore; and a pair of electrodes respectively disposed in front and rear of the pore membrane and provided to be in electrical contact with the flowing solution to measure an ion conductivity change in front and rear of the pore membrane, wherein a diameter D of the micropore is larger than a diameter of the target cell, a thickness t of the pore membrane is 0.5 µm to 1 mm, and a slenderness ratio (t/D) is 0.001 to 5.

A cross-sectional shape of the micropore formed on the pore membrane may be a circle.

A cross-sectional shape of the micropore formed on the pore membrane may be any one of an oval, a rectangle, and a rounded rectangle.

A ratio (DL/DS) of a short axis DS of the micropore to a long axis DL thereof may be 1.5 or more.

The device may further include a measurer for measuring one or more electrical characteristics of a blocking current, resistance, voltage, capacitance and impedance measured through the pair of electrodes.

The pressure generating means may generate a pressure difference between the inlet chamber and the outlet chamber by gravity or a water head difference principle to cause flow of the solution.

The pressure generating means may be a syringe pump or pressure pump for pressurizing the solution.

The pore membrane may be formed of a non-conductive polymer material including one or more of polyimide, polypropylene, polyethylene terephthalate, polyurethane, polycarbonate, acrylic and Teflon.

The pore membrane may be formed of a ceramic material with non-conductive properties including one or more of $Si_3N_4$, $HfO_2$, $SiO_2$, Mica, h-BN and Quartz.

The target cell may be any one of a red blood cell, a white blood cell, an exosome, a virus and a circulating tumor cell.

The device may further include: an inlet channel formed between the inlet chamber and the pore membrane and connected to the inlet chamber to guide flow of the solution containing the target cell; and an outlet channel formed between the outlet chamber and the pore membrane and connected to the outlet chamber to guide flow of the solution containing the target cell.

The inlet chamber may include: a flow channel for guiding flow of the target cell-containing solution toward the pore membrane; and buffer channels joined from opposite sides of the flow channel and configured to guide flow of a buffer solution toward the pore membrane, wherein the buffer solution flows to opposite sides of the target cell-containing solution.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates an exemplary view of a device for analyzing a single cell using a micropore according to an embodiment of the present disclosure;

FIGS. 2A to 2D illustrate exemplary views of various cross-sectional shapes of pores provided in a device for analyzing a single cell using a micropore according to an embodiment of the present disclosure;

FIGS. 3A and 3B are graphs illustrating a change in a blocking current signal measured according to the deformation of a cell passing through a pore using a device for analyzing a single cell using a micropore according to embodiments of the present disclosure;

FIG. 4 illustrates an exemplary view of a device for analyzing a single cell using a micropore according to another embodiment of the present disclosure; and FIG. 5 illustrates an exemplary view of a device for analyzing a single cell using a micropore according to still another embodiment of the present disclosure.

DETAILED DESCRIPTION OF THE DISCLOSURE

Now, a preferred embodiment of a device for analyzing a single cell using a micropore according to the present disclosure is described in detail with reference to the accompanying drawings.

The present disclosure can have various changes and can have various forms, and thus, specific embodiments are illustrated with reference to the accompanying drawings and described in detail in the text.

However, this is not intended to limit the present disclosure to the specific embodiments, it should be understood to include all modifications, equivalents and substitutes included in the spirit and scope of the present disclosure. In the drawings, the sizes and quantities of subjects are exaggerated or reduced for clarity.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising" when used in this specification, specify the presence of stated features, steps, functions, components, or combinations thereof but do not preclude the presence or addition of other features, steps, functions, components, and/or combinations thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates an exemplary view of a device for analyzing a single cell using a micropore according to an embodiment of the present disclosure, and FIGS. 2A to 2D illustrate exemplary views of various cross-sectional shapes of pores provided in a device for analyzing a single cell using a micropore according to an embodiment of the present disclosure.

Referring to FIGS. 1 and 2A to 2D, a device for analyzing a single cell using a micropore according to a preferred embodiment of the present disclosure includes an inlet chamber 100, an outlet chamber 200, a pore membrane 300, a pressure generating means 400, electrodes 510 and 520, and a measurer 600. These components are described in detail below.

The present disclosure has a technical feature in that when cells pass through a micropore 310, whose diameter is slightly larger than the diameter of cell, formed in the pore membrane 300 having a thin thickness and a predetermined or more pressure is applied to the cells, measurement results of normal cells differ from measurement results of diseased cells because normal cells have a thin and long shape, whereas diseased cells have relatively less deformation.

A solution including a target cell C is contained in the inlet chamber 100. Here, the target cell C may be, without being limited to, any one of red blood cells, white blood cells, exosomes, viruses and circulating tumor cells and may be various types of biological cells. Hereinafter, red blood cells are described as an embodiment of the target cell C of the present disclosure.

The outlet chamber 200 may be provided on opposite side corresponding to the inlet chamber 100.

The pore membrane 300 may be provided between the inlet chamber 100 and the outlet chamber 200 and may include the micropore 310 penetrating the pore membrane 300.

The pressure generating means 400 is provided in the inlet chamber 100 or the outlet chamber 200 and serves to generate a pressure difference between the inlet chamber 100 and the outlet chamber 200 such that a solution in the inlet chamber 100 flows toward the outlet chamber 200 to pass through the micropore 310. Here, as illustrated in the accompanying drawing of the present disclosure, the pressure generating means 400 provided in the inlet chamber 100 is described as an embodiment.

The electrodes 510 and 520 are respectively disposed in front and rear of the pore membrane 300 and are in electrical contact with a flowing solution to measure ion conductivity changes in front and rear of the pore membrane 300.

The measurer 600 serves to measure one or more electrical characteristics of blocking current, resistance, voltage, capacitance and impedance measured through the pair of electrodes 510 and 520.

In the device for analyzing a single cell using a micropore of the present disclosure, the diameter D of the micropore 310 is larger than the diameter of the target cell C, the thickness t of the pore membrane 300 is about 0.5 μm to about 1 mm, and a slenderness ratio (t/D) is 0.001 to 5, preferably a low aspect ratio (t/D) is 2 or less.

Meanwhile, so as to measure the deformation of cell, it is necessary to induce the cell to be deformed by the shear force due to flow in a solution. For this, it is necessary to make a solution to flow by pressure, not by a conventional electrophoresis method that causes flow by an electrical method.

In addition, the viscosity of solution, the diameter of channels and a micropore, and the strength of pressure are factors that determine the magnitude of applied shear force, and therefore should be adjusted according to the characteristics (rigidity) of each cell.

In addition, the diameter of the micropore 310 is slightly larger than the diameter of the target cell C to be measured. When the diameter of the micropore 310 is excessively larger than the diameter of the target cell C, a sensitivity of measuring a change in ion conductivity is decreased, whereas when the diameter of the micropore 310 is similar to the diameter of the target cell C, the cell collides near the micropore 310. Accordingly, it is preferred to manufacture the micropore 310 to have a diameter within 1.1 to 2 times the diameter of the target cell C. Here, the diameter of the micropore 310 is not limited to a certain size.

Regarding the slenderness ratio, the resistive pulse sensing (RPS) equipment based on the principle of the existing Coulter counter has a very high slenderness ratio, so that, even if the shape of cell changes until the cell passes through an inlet and exits to an outlet, a change in ion conductivity hardly occurs. Accordingly, it is difficult to accurately measure a change in the shape of cell.

However, if the slenderness ratio is lowered, it becomes possible to analyze the shape and shape change of a passing object (cell) as in existing other studies.

This is because a change in ionic conductivity starts to occur at an inlet of the micropore 310 before a cell enters, the ionic conductivity is the lowest when passing through the micropore 310, and a change is measured after passing through the micropore 310.

In addition, since the shape of cell starts to change at the inlet of the micropore 310 by pressure-based flow and returns to an original shape thereof as it exits to the outlet of the micropore 310, it may be checked whether the shape is changed by generated shear force.

Therefore, it is possible to find a cell whose shape is almost not deformed due to cellular abnormality.

Therefore, the slenderness ratio in the micropore 310 is preferably as low as 0.001, but preferably 2 or less in consideration of manufacturing difficulties and resistance to pressure. In other words, the diameter D of the micropore 310 is preferably two times or less than the diameter of the target cell C to be analyzed, and the thickness t of the pore membrane 300 is preferably similar to or smaller than the diameter of the target cell C.

However, the slenderness ratio is not limited to only 2, and it is considered that 3 to 5 or less may be effective. However, since a maximum slenderness ratio of an elongated target cell C can be considered to be about 5, the measurement of the degree of deformation of the target cell C may not be accurate when the slenderness ratio of the micropore 310 is greater than 5. Accordingly, the slenderness ratio of the micropore 310 is preferably 5 or less.

In addition, considering that the largest cell among target cells C is generally an egg cell, the size of egg cell is about 150 μm and the diameter of the micropore 310 is about 250 μm, the diameter of the micropore 310 may be manufactured up to 1 mm for the stable passage of the egg cell because the slenderness ratio is about 0.5/250=0.002 when the thickness t of the pore membrane 300 is a minimum value 0.5 μm. In this assumption, the slenderness ratio is preferably 0.001 or more.

Meanwhile, the pore membrane 300 having the micropore 310 is advantageous to have a thin thickness in consideration of the slenderness ratio, but since an excessively thin pore membrane 300 has a characteristic of being easily broken in an environment driven by the pressure of a fluid, the thickness t of the pore membrane 300 is preferably determined depending upon the pressure of fluid flowing in the chamber considering the diameter of cell and the slenderness ratio of the pore membrane 300.

When the thickness t of the pore membrane 300 is less than 0.5 μm, the pore membrane 300 may be damaged by the pressure of solution flowing between the inlet chamber 100 and the outlet chamber 200. Accordingly, the thickness t of the pore membrane 300 is preferably 0.5 μm or more.

In addition, since the largest cell among target cells C is generally an egg cell and the size of egg cell is about 150 μm as described above, the thickness t of the pore membrane 300 is preferably 1 mm or less, considering that an upper limit of a slenderness ratio is 5.

Here, the shape of the micropore 310 may be a generally used circle, and, considering the shape of cell, a similar shape having a diameter slightly larger than the diameter of a circle is preferred.

More specifically, the red blood cells have a disk-like shape, but a shape having anisotropy is more preferred in consideration of a shape such as an oval shape or rugby ball shape deformed by shear force (shear stress).

In particular, a long axis DL of the micropore 310 preferably differs from a short axis DS thereof. The red blood cells have a height of about 2 μm when a side length thereof is about 8 μm. Accordingly, a change in ion conductivity may be more precisely measured by manufacturing the micropore 310 to have a ratio of about 4:1 and to be slightly larger than the size of red blood cell.

For example, when the micropore 310 is manufactured to have a rectangular shape and a ratio of the length of the long side DL of the micropore 310 to the length of the short side DS thereof is about 4:1, i.e., and the size of the micropore 310 is 1.1 to 2 times larger than the size of the red blood cell, both an abnormal hard red blood cell and an easily deformed normal red blood cell may be measured.

Therefore, red blood cells with low deformability pass through a micropore while maintaining the disk-shaped shape thereof, and red blood cells with high deformability change the shape thereof near the micropore as the length thereof increases, so that blocking current signal are very differently obtained. Using this, the deformability of red blood cell may be determined based on the size and shape of the red blood cell.

The DL/DS ratio is not necessarily to be 4 and may be appropriately selected in consideration of the shape of a deformed red blood cell and a measured electrical change. However, since a ratio of a long axis length of the cross section of a red blood cell to a short axis length thereof is 1.5 or more when the red blood cell is deformed, a ratio of the long axis (DL) length of the micropore 310 to the short axis (DS) length thereof is preferably at least 1.5 or more.

Therefore, it is preferred to set the ratio of the long axis (DL) length of the anisotropically shaped micropore 310 to the short axis (DS) length thereof in consideration of the shape and deformation of the target cell C.

In addition, the micropore 310 does not have to be a rectangle shape when the shape is not circular, and a shape such as an oval is also preferable. By using an oval shape, both a red blood cell having a circular disc shape, and a deformed cell may be detected at the same time.

In addition, a shape (a rounded rectangle) wherein a rectangular shape and an oval shape are combined is also possible. Considering that the minimum thickness of red blood cell is maintained, a side of the micropore 310 may have a straight shape and the long axis thereof may have a curved oval shape.

In other words, the micropore 310 may have a circular shape, but it is difficult to effectively measure a shape reduced compared to the cross section of the micropore 310 when the target cell C is deformed.

In particular, in the case of a disk-shaped red blood cell, the size of the micropore 310 is similar to the size of the cell in the radial direction of the circle, but the thickness of the cell hardly occupies the cross-sectional area of the micropore, so that less blocking current is generated. To address this problem, the shape of the micropore 310 may be changed similar to the disk shape of red blood cell.

Meanwhile, to measure whether the target cell C passes through the micropore 310, the electrodes 510 and 520 are disposed along the flow direction of a solution on the front and rear of the pore membrane 300, and the electrodes 510 and 520 are generally made of Ag/AgCl. The electrodes 510 and 520 may be made of other conductive materials such as gold, titanium and carbon.

In particular, since a cell occupies the volume of an ionic liquid with high conductivity as the target cell C passes through the micropore 310 between the two electrodes 510 and 520, and the measured ion conductivity momentarily decreases, a current drop occurs when the current is measured in front and rear of the micropore 310, which is called blocking current.

To measure this, it is common to measure a current while applying a very low voltage as a bias.

However, it is not necessary to measure the current, and resistance or voltage, capacitance, impedance, and the like that change according to clogging of the micropore 310 may be measured.

Meanwhile, a polymer having non-conductive properties or a material having ceramic properties may be used as a material of the pore membrane 300.

Additionally, the polymer may include any one or more of polyimide, polypropylene, polyethylene terephthalate, polyurethane, polycarbonate, acrylic and Teflon, a variety of similar polymers may be used, and any materials that can be manufactured to a thickness of micrometers (μm) without being limited to one or more specific materials may be used.

In addition, the ceramic may include any one or more of $Si_3N_4$, $HfO_2$, $SiO_2$, Mica, h-BN and Quartz, other ceramic materials may be used, and any materials that can be manufactured to a thickness of micrometers (μm) may be used without being limited one or more specific materials.

Meanwhile, various pressure generating means 400 for generating a pressure difference between the inlet chamber 100 and the outlet chamber 200 may be included to cause the flow of a solution through the channel.

For example, a solution may flow while a pressure difference between the inlet chamber 100 and the outlet chamber 200 is generated by gravity or the water head difference principle. In particular, the inlet chamber 100 or the outlet chamber 200 may be provided with a syringe pump or pressure pump for pressurizing a solution.

FIGS. 3A and 3B are graphs illustrating a change in a blocking current signal measured according to the deformation of a cell passing through a pore using a device for analyzing a single cell using a micropore according to embodiments of the present disclosure.

First, referring to FIG. 1, a target cell C such as a red blood cell is introduced into the inlet chamber 100, and a pressure difference is generated by the pressure generating means 400 between the inlet chamber 100 and the outlet chamber 200, which causes the solution to flow.

Here, the pore membrane 300 including the micropore 310 is placed between two chambers, and the solution passes through the pore membrane 300. At this time, the shape of the target cell C is changed in the applied pressure environment. In particular, since the size of the micropore 310 is very small compared to the chambers or the connected channel, the shape of the target cell C is abruptly changed by shear force around the micropore 310. At this time, the size of the micropore 310 is larger than the size of the target cell C, and thus, the target cell C passes through the micropore 310 along the flow inside the micropore 310, rather than colliding with a wall of the micropore 310.

When the target cell C passes through the micropore 310 while being deformed as described above, a change in ion conductivity may be measured through the electrodes 510 and 520 disposed in front and rear of the pore membrane 300. At this time, if the target cell C is not deformed, it is determined that the target cell C may pass through the micropore 310 in a shorter time while occupying a larger area of the micropore 310, so that a blocking current may occur as shown in FIGS. 3A and 3B.

On the other hand, in the case of a deformed cell, the passage time td of the cell increases, compared to the non-deformed cell of FIG. 3A, while the length of the cell increases, and the volume of the cell occupying the micropore 310 decreases so that the magnitude IB of blocking current tends to decrease, as shown in FIG. 3B. By comparing the two values, a deformed cell or non-deformed cell by shear force generated by pressure may be distinguished.

This method may be effectively used to detect a very small number of infected red blood cells among many red blood cells, in a situation in which red blood cells are hardened and the deformability of cells decreases, when contracted a disease such as malaria.

In general, the diameter 'D' of the micropore 310 is preferably made larger than the size of the target cell C, and the thickness 't' of the micropore 310 is preferably made similar to or smaller than the size of the target cell C.

However, even if the thickness t of the pore membrane 300 is slightly larger than the size of the target cell C, a signal change may occur when the target cell C approaches around the inlet and outlet of the micropore 310 in a situation in which the thickness t to the diameter D (slenderness ratio) is not large. Accordingly, the thickness t of the pore membrane 300 is not necessarily smaller than the target cell C.

In the present disclosure, the diameter of the target cell C is not limited, and the feature that the shape of an infected cell or abnormal cell differs from a normal cell having a circle-like shape or is not deformed by shear force is used. In particular, the degree of cell deformability may be relatively compared and evaluated by measuring the degree of cell deformation through a signal.

In other words, it is considered that a non-deformed target cell C would exhibit a short passage time td while occupying a larger cross-section area of the micropore 310, whereas, in the case of a deformed target cell C, the magnitude of a blocking current is relatively small as the deformed target cell C occupies a smaller cross-section area of the micropore 310, but the length of the cell increases, so that a longer passage time td would be exhibited when passage speeds are the same.

In addition, even if the deformation is not dynamic, it is considered that red blood cells with a different shape would obtain a signal different from that of a normal red blood cell. In addition to this indicator, additional information (signal slope, symmetry, etc.) about the shape of the blocking current may be used to identify cells.

FIG. 4 illustrates an exemplary view of a device for analyzing a single cell using a micropore according to another embodiment of the present disclosure.

Referring to FIG. 4, the device may further include an inlet channel 110 formed between an inlet chamber 100 and a pore membrane 300 and connected to the inlet chamber 100 to guide the flow of a solution including a target cell C; and an outlet channel 210 formed between an outlet chamber 200 and the pore membrane 300 and connected to the outlet chamber 200 to guide the flow of a solution including a target cell C.

In other words, the device of FIG. 4 may further include passages, i.e., an inlet channel 110 and outlet channel 210 that are connected to the chambers in front and rear of the pore membrane 300 in the center of which the micropore 310 is formed, in addition to the inlet chamber 100 and the outlet chamber 200, as in a microfluidic chip widely used as another embodiment.

The passages may prevent an abrupt change in the channel when the pore membrane 300 is connected to the inlet chamber 100 and the outlet chamber 200 and may help the target cell C to pass through the center of the pore membrane 300.

Here, passages channels, such as the inlet channel 110 and the outlet channel 210, for connection with the pore membrane 300 may be formed between the inlet chamber 100 and the outlet chamber 200, but the passages channels are not necessary. In addition, the target cell C may easily enter the center of the micropore 310 when the passage (channel) connecting each chamber and the pore membrane 300 to each other is configured in a gradually narrower shape for convenience of measurement.

FIG. 5 illustrates an exemplary view of a device for analyzing a single cell using a micropore according to still another embodiment of the present disclosure.

Referring to FIG. 5, an inlet chamber 100 may include a flow channel 101 for guiding the flow of a solution including a target cell C toward a pore membrane 300; and buffer channels 102 joined from opposite sides of the flow channel 101 and configured to guide the flow of a buffer solution toward the pore membrane 300. Due to such a configuration, the buffer solution flows to opposite sides of the solution containing the target cell C.

In addition, FIG. 5 illustrates an embodiment of focusing the target cell C to the center, at which the flow is the highest, such that the target cell C accurately enters the micropore 310. As such a focusing method, existing various methods may be used.

In general, the inlet chamber 100 may be divided into three channels in which the flow occurs. The channels may include a channel in the center and channels on both sides of the middle channel A solution containing the target cell C flows in the middle channel, and a buffer solution flows in the channels on both sides of the middle channel.

INDUSTRIAL APPLICABILITY

A device for analyzing a single cell using a micropore of the present disclosure can rapidly measure the deformability of a variety of cells, particularly the deformation of red blood cells, and thus, can be utilized for early and rapid diagnosis of diseases such as malaria infection, sickle cell disease, hereditary red blood cell abnormalities and cardiovascular diseases.

According to the present disclosure, the number, sizes and shapes of individual cells, deformability of cells by shear force, and the like can be measured at the same time as multiple cells contained in a flowing solution rapidly passes through a micropore inside a channel by a pressure difference between an inlet chamber and an outlet chamber, so that the abnormality of cells can be rapidly and accurately determined.

The present disclosure has been described based on a preferred embodiment, but those skilled in the art will appreciate that the technical idea of the present disclosure is not limited thereto and various modifications, additions and substitutions are possible within the scope of the accompanying claims of the disclosure. Therefore, it is obvious that the modifications, additions and substitutions are included in the scope of the accompanying claims of the present disclosure.

What is claimed is:

1. A device for analyzing a single cell using a micropore, comprising:
    an inlet chamber in which a solution including a target cell is contained;
    an outlet chamber provided on an opposite side of the inlet chamber;
    a pore membrane disposed between the inlet chamber and the outlet chamber and configured to include a micropore thereon;
    a pressure generating means provided in the inlet chamber or the outlet chamber and configured to generate a pressure difference between the inlet chamber and the outlet chamber such that a solution in the inlet chamber flows toward the outlet chamber to pass through the micropore; and
    a pair of electrodes respectively disposed in front and rear of the pore membrane and provided to be in electrical contact with the flowing solution to measure an ion conductivity change in front and rear of the pore membrane,
    an inlet channel formed between the inlet chamber and the pore membrane and connected to the inlet chamber to guide flow of the solution containing the target cell; and
    an outlet channel formed between the outlet chamber and the pore membrane and connected to the outlet chamber to guide flow of the solution containing the target cell,
    wherein the inlet channel connecting the inlet chamber and the pore membrane to each other is configured in a gradually narrower shape, and
    wherein a diameter D of the micropore is larger than a diameter of the target cell, a thickness t of the pore membrane is 0.5 μm to 1 mm, and a slenderness ratio (t/D) is 0.001 to 5.

2. The device according to claim 1, wherein a cross-sectional shape of the micropore formed on the pore membrane is a circle.

3. The device according to claim 1, wherein a cross-sectional shape of the micropore formed on the pore membrane is any one of an oval, a rectangle, and a rounded rectangle.

4. The device according to claim 3, wherein a ratio (DL/DS) of a short axis DS of the micropore to a long axis DL thereof is 1.5 or more.

5. The device according to claim 1, further comprising a measurer for measuring one or more electrical characteristics of a blocking current, resistance, voltage, capacitance and impedance measured through the pair of electrodes.

6. The device according to claim 1, wherein the pressure generating means generates a pressure difference between the inlet chamber and the outlet chamber by gravity or a water head difference principle to cause flow of the solution.

7. The device according to claim 1, wherein the pressure generating means is a syringe pump or pressure pump for pressurizing the solution.

8. The device according to claim 1, wherein the pore membrane is formed of a non-conductive polymer material including one or more of polyimide, polypropylene, polyethylene terephthalate, polyurethane, polycarbonate, acrylic and Teflon.

9. The device according to claim 1, wherein the pore membrane is formed of a ceramic material with non-conductive properties including one or more of $Si_3N_4$, $HfO_2$, $SiO_2$, Mica, h-BN and Quartz.

10. The device according to claim 1, wherein the target cell is any one of a red blood cell, a white blood cell, an exosome, a virus and a circulating tumor cell.

11. The device according to claim 1, wherein the inlet chamber comprises:
   a flow channel for guiding flow of the target cell-containing solution toward the pore membrane; and
   buffer channels joined from opposite sides of the flow channel and configured to guide flow of a buffer solution toward the pore membrane,
   wherein the buffer solution flows to opposite sides of the target cell-containing solution.

* * * * *